Feb. 20, 1934.  H. E. BREY  1,947,823
CRANE DRIVING AND STEERING MECHANISM
Filed Aug. 3, 1925   5 Sheets-Sheet 2
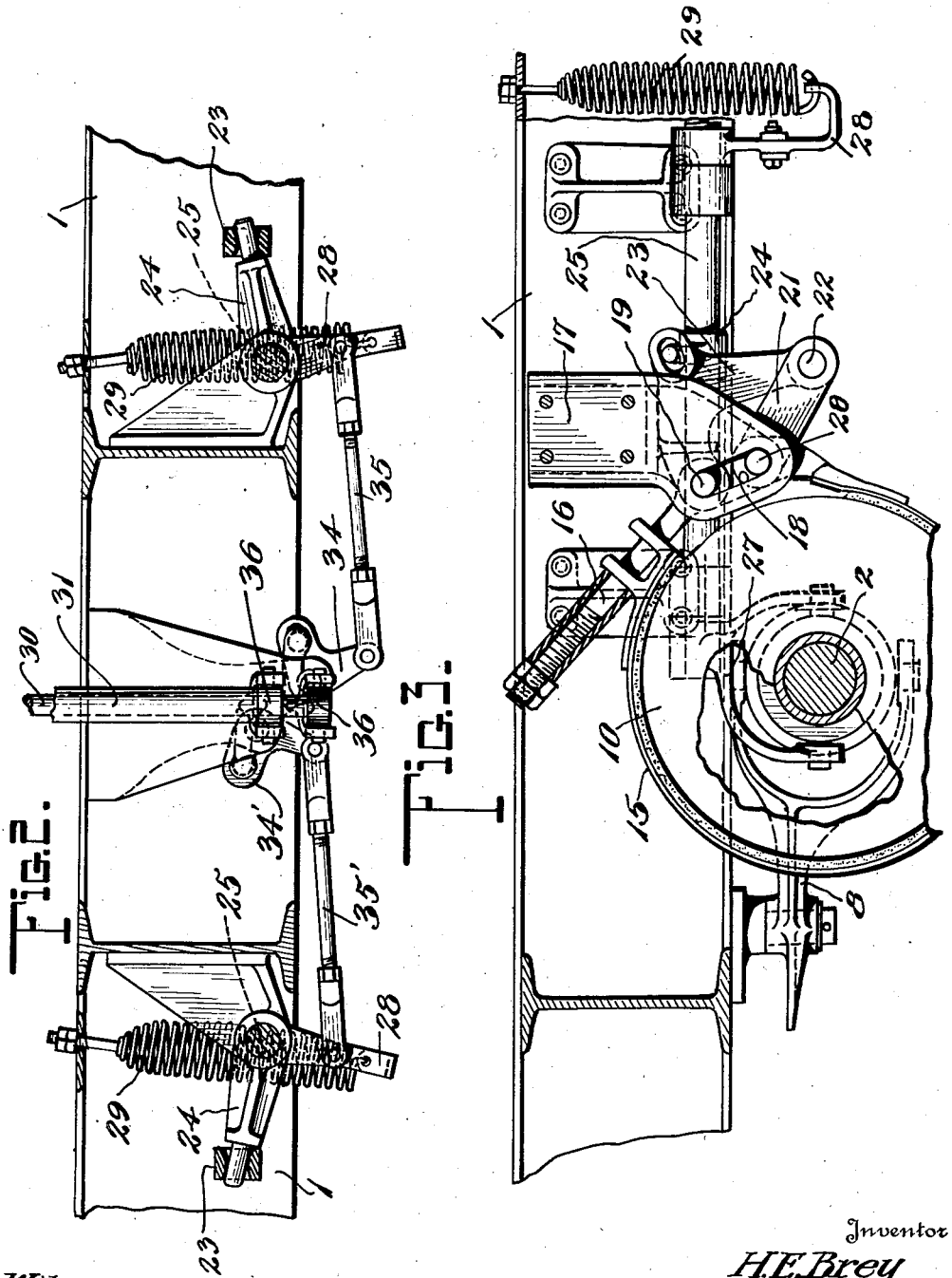
Inventor
H. E. Brey Feb. 20, 1934.  H. E. BREY  1,947,823
CRANE DRIVING AND STEERING MECHANISM
Filed Aug. 3, 1925   5 Sheets-Sheet 3
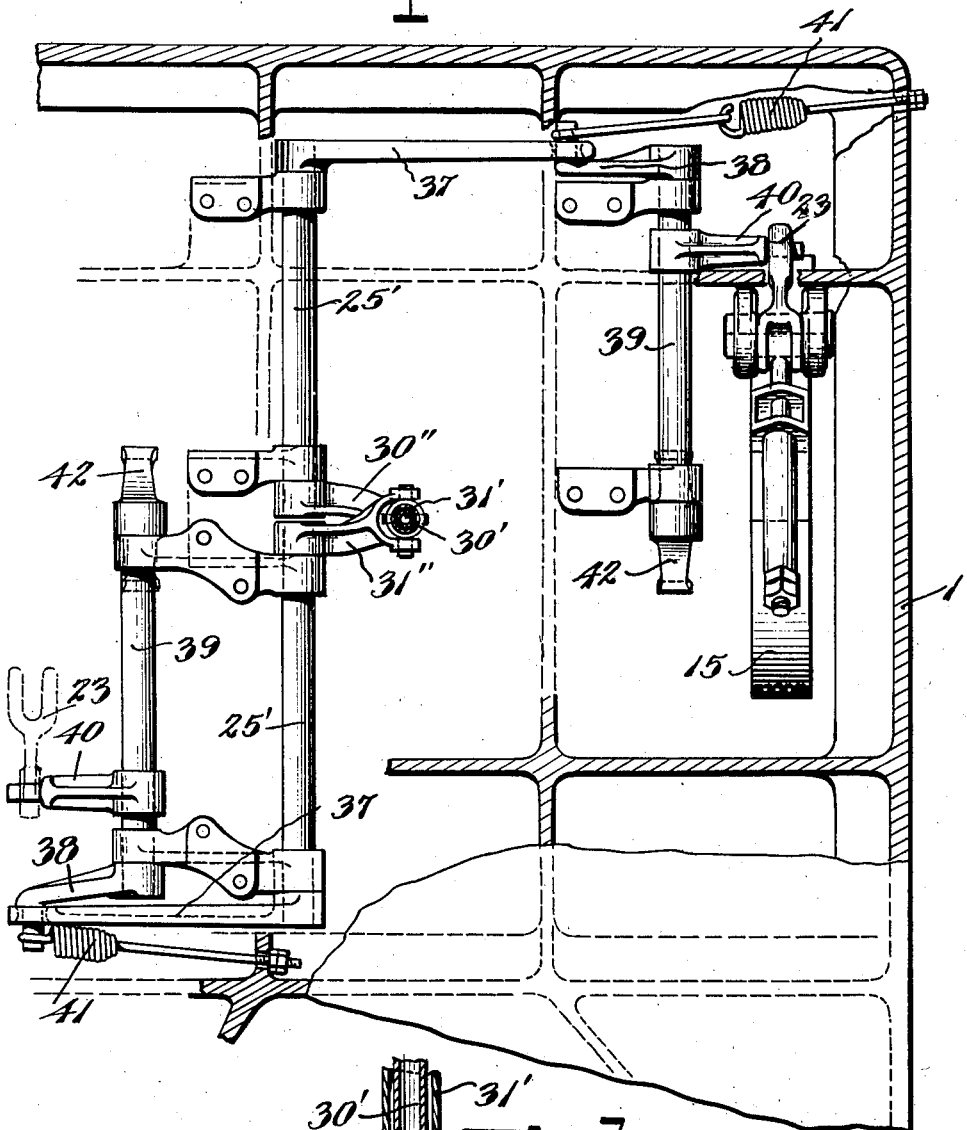
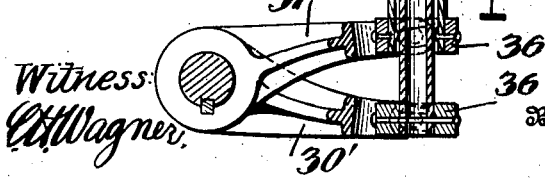

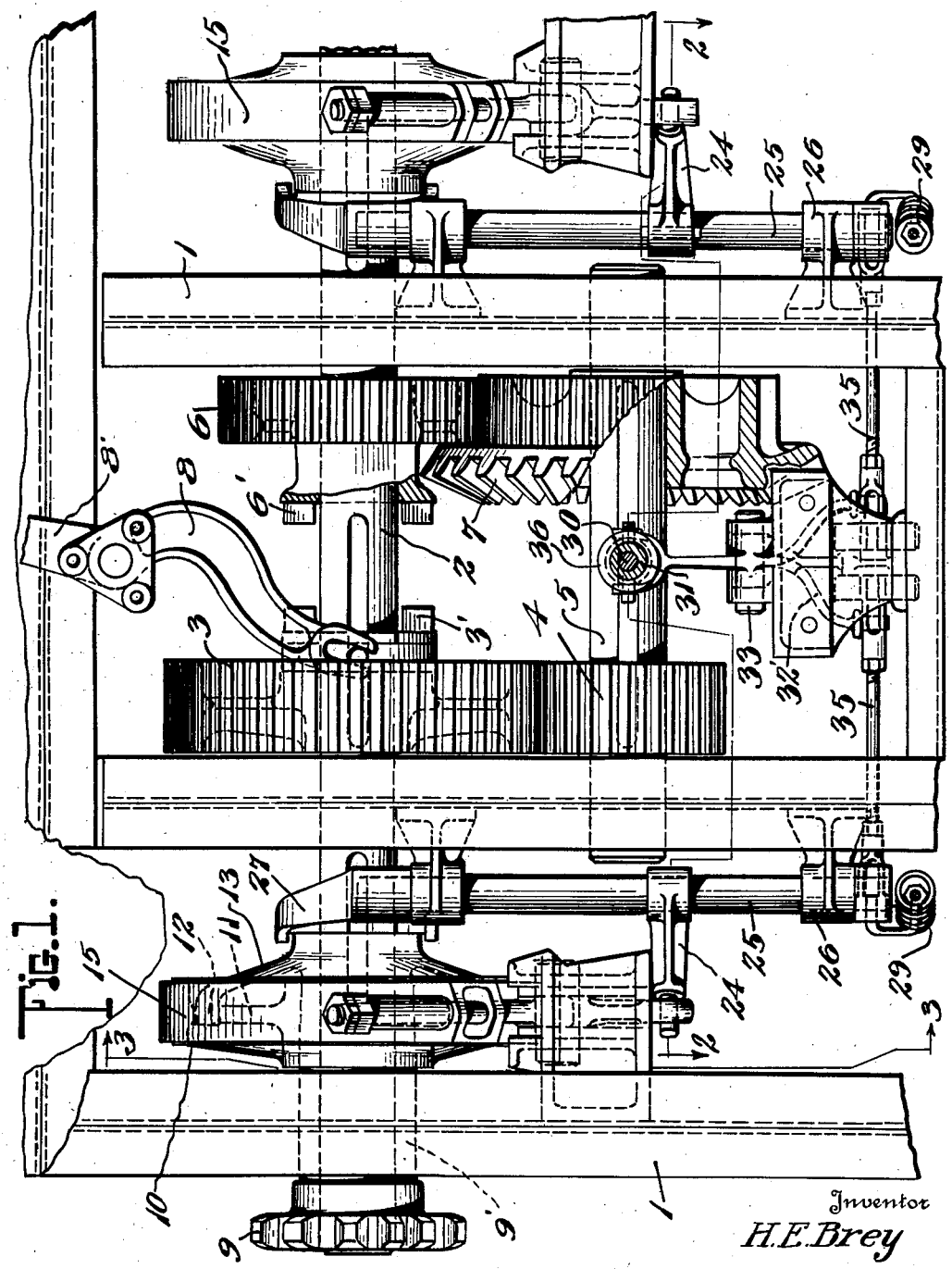

Feb. 20, 1934.　　　H. E. BREY　　　1,947,823
CRANE DRIVING AND STEERING MECHANISM
Filed Aug. 3, 1925　　　5 Sheets-Sheet 4
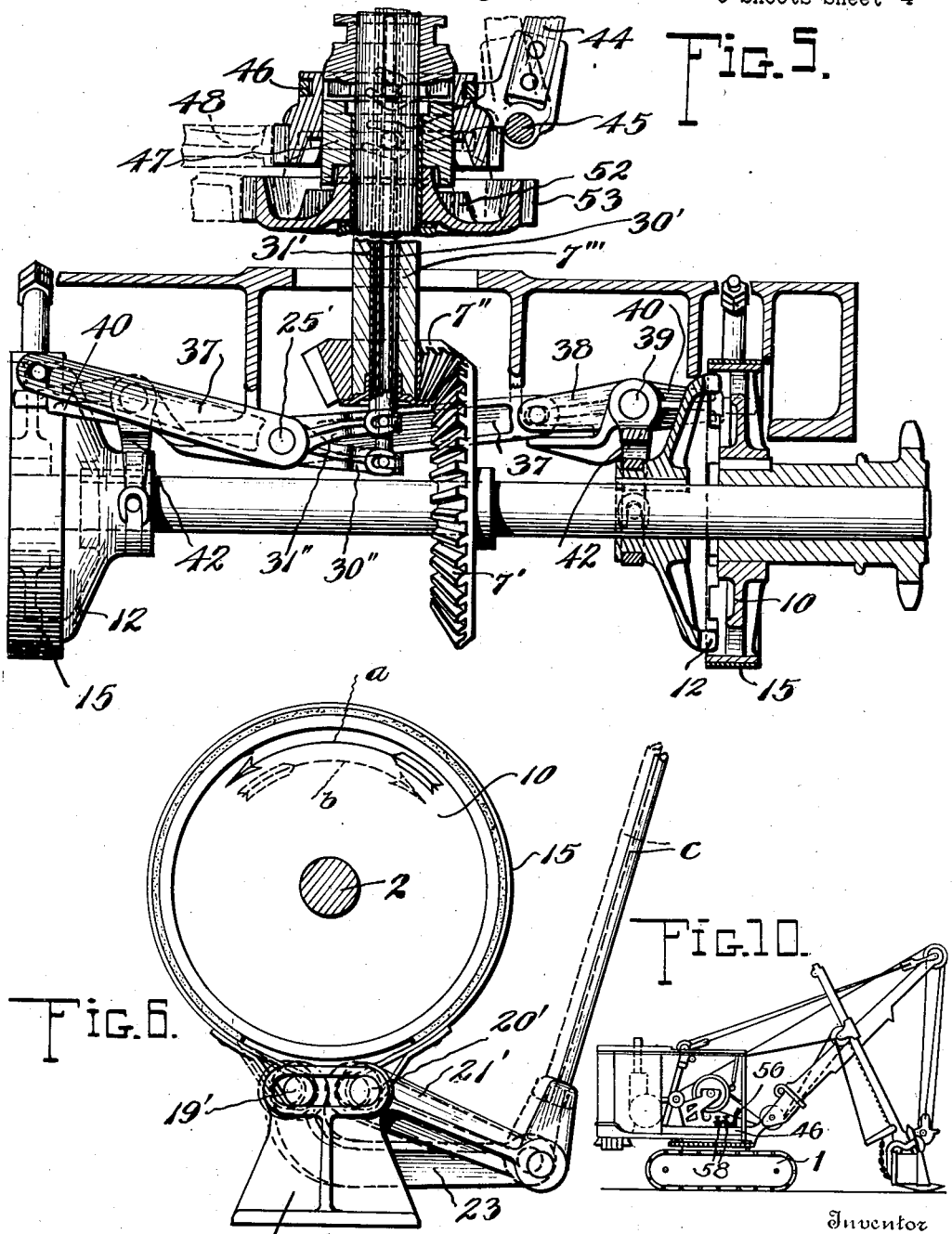
Inventor
H. E. Brey Feb. 20, 1934.  H. E. BREY  1,947,823

CRANE DRIVING AND STEERING MECHANISM

Filed Aug. 3, 1925    5 Sheets—Sheet 5

Inventor
H. E. Brey
By Robb & Robb & Hill
Attorneys

Patented Feb. 20, 1934

1,947,823

UNITED STATES PATENT OFFICE

1,947,823

CRANE DRIVING AND STEERING MECHANISM

Harold E. Brey, Milwaukee, Wis., assignor to Koehring Company, Milwaukee, Wis., a corporation Application August 3, 1925. Serial No. 47,985

6 Claims. (Cl. 180—9.2)

The invention hereof has to do with portable cranes and power shovels, improvements being provided in the change speed mechanism for propelling the machine at different speeds. In one construction this mechanism is controlled from the car body of the crane, provisions being made for its operation by means coaxial with the center pin when a rotary platform or car body is used; and in another form the change speed means is operable from the ground at one end of the machine.

This invention also involves certain steering and braking mechanism, particularly useful in these large portable machines of the type mounted upon endless traction devices. Where these cranes are equipped with a rotary body or turntable, the control for the endless traction devices is customarily designed on the principle of the centre pin steering means shown in Thew Patent No. 593,062, granted November 2, 1897.

However, it is to be understood that the improvements of this invention may be used on portable machines other than cranes, and irrespective of whether the central control method of steering is employed.

An important feature of the invention resides in the peculiar braking appliances that are so designed herein that they may act upon the brake drums thereof, for braking the machine whether it is moving forwardly or rearwardly in straight lines, or whether it is moving forwardly or rearwardly in curved lines as required in turning the machine when operating in either of the opposite directions.

The invention involves certain novel combinations of braking and clutching parts whereby the simultaneous discontinuance of the application of power for driving the endless tractors together or either of them, with corresponding application of brakes to the said traction devices together or either of them, may be obtained.

The turning of the machine equipped with the invention is effected by discontinuing the drive acting upon one traction device whilst the other drive remains effective, and at the same time applying a brake to the traction device at the side of the machine where the drive is discontinued, and the invention involves specific instrumentalities for the performance of the above functions believed to be novel.

Furthermore, owing to the facility with which the brake operations may be effected whether the machine is traveling in either direction, owing to the present special design of brake mechanism a steering action of the machine when moving in either direction may be secured, as above suggested, and this is believed to be broadly new in the art to which the invention appertains, especially as adapted to the peculiar traction mechanism as used herein.

For a full understanding of the invention including other detailed features of novelty than those referred to above, reference is to be had to the following description in connection with the accompanying drawings in which:

Figure 1 illustrates a preferred form of my invention comprising the traction driving means for a crane or similar heavy machine, the traction devices themselves not illustrated but the drive gearing and brake and clutch instrumentalities being fully shown with their control means.

Figure 2 is a sectional view taken about on the line 2—2 of Figure 1, looking in the direction of the arrows.

Figure 3 is a sectional view taken about on the line 3—3 of Figure 1, also looking in the direction of the arrows.

Figure 4 illustrates a modified type of the mechanism of the invention.

Figure 5 is a sectional view taken about centrally of the illustration of Figure 4 and showing in addition thereto the drive shaft by which the traction devices are actuated.

Figure 6 is a view intended to be diagrammatic primarily to facilitate an understanding of the action of the brake bands or shoes in conjunction with the brake drums whereby braking effects are obtainable when the brake drums are operated in either of the opposite directions.

Figure 7 is a detailed fragmentary sectional view showing more particularly the manually operated central control of devices employed in conjunction with the construction of Figures 4 and 5.

Figure 10 is a diagrammatic view of a shovel crane apparatus to which the present invention is adapted to be applied.

Figure 8:
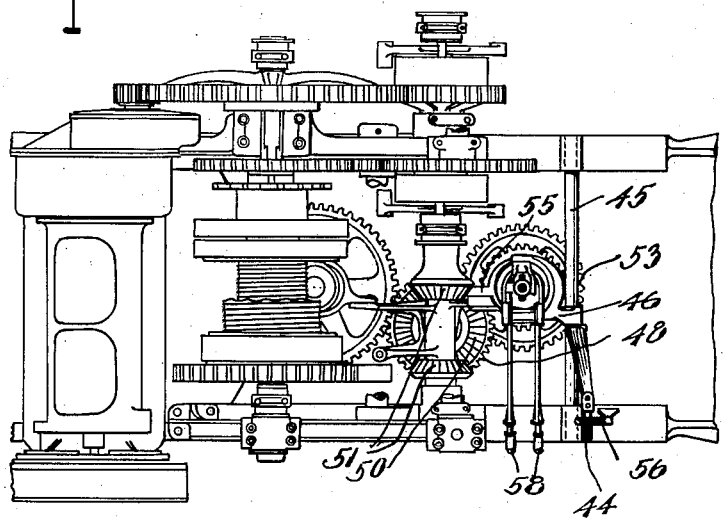
Figure 8 is a plan view of general assembly of the upper mechanism on the rotary crane body showing primarily the change speed control devices according to the form of the invention of Figures 4 to 7 inclusive.

Describing the details of the construction of both forms of the invention presented herein and referring first to Figures 1 to 3 inclusive, the framework of the machine equipped with the invention is designated 1 and may be comprised of beams or channels suitably fabricated in the manner well known in the art. This frame 1 is really the traction frame of the crane or machine to which the invention is applied and it is equipped with a traction or driven shaft 2, mounted in suitable bearings and extending entirely across the frame of the machine so as to project from the ends of the frame more particularly as shown at the left in Figure 1. On this traction shaft 2 is splined a low speed driven gear 3, meshing for low speed purposes with a low speed driving gear 4, keyed to a counter-shaft 5 adjacent to the traction shaft 2. Mounted loosely on the traction shaft 2 is high speed driven gear 6, normally meshing with the main driving gear 7 keyed to the counter-shaft 5, and consisting of a combined bevel and spur gear; the spur gear engaging the gear 6 and the bevel gear being adapted to be driven by any suitable driving gearing leading to the source of power.

Where the machine is a rotary crane the main combination gear 7 will be driven by a bevel gear, coaxial with the center pin of the turntable body of the machine and operated from the engine or motor mounted on the said turntable body, according to the latest improved construction.

A somewhat similar arrangement is shown in Figure 5 in respect to the main driving gear 7', operated by the bevel pinion 7'', carried by the hollow driving shaft 7''' that is coaxial with the center pin of the turntable type of crane.

The gears 3 and 6 are equipped with jaw clutches 3' and 6', respectively. The gear 3 is shiftable by means of an actuating yoke 8 to carry the said gear 3 out of meshing relation with the gear 4 and to clutch together the clutches 3' and 6'.

The gear 7 may be driven forwardly or in reverse directions, so in effect it is a main forward and reverse driving gear; the control for its forward and reverse actions being located between the power plant and said gear, and not shown.

With the foregoing structure, assuming that the shaft 5 is driven by the gear 7, with the arrangement of the gears as in Figure 1, the gear 6 idles. The shaft 5 turns driving the gear 4, and thereby communicating low speed drive action to the traction shaft 2 through the low speed gear 3. By shifting the gear 3 out of mesh with the gear 4 and meshing the parts 3' and 6' the shaft 5 drives the shaft 2 through the gear 6 and the gear 3, which are clutched together, and in this way high speed is communicated to the shaft 2.

The means for operating the endless traction devices, or whatever other type of traction device may be the equipment operated by the shaft 2, includes the traction device or multiplane driving gear 9, one of which is carried by each end of the shaft 2. The said gear 9 being provided with a sleeve 9' as a part thereof, which sleeve extends through the adjacent bearing in the frame 1 and is equipped with a brake and clutch drum 10, the form of which is indicated in dotted lines in Figure 1, and shown most clearly in the construction sectionally depicted in Figure 5. This drum 10 includes the usual outer braking periphery, and a web 11 connecting its hub and periphery or rim; said web being equipped with openings at intervals therein, adapted to receive clutch projections 12 of the clutch 13, which is keyed to the shaft 2 as at 14.

Surrounding the brake drum 10 is a brake band 15, the arrangement of which is best seen in Figure 3. One end of the brake band 15 is connected by an adjusting bolt or member 16 with the bracket means 17, the latter comprising spaced bracket members having slots 18, which slots are disposed somewhat tangentially to the rim of the drum 10, but spaced therefrom. The adjustable fastening member 16 is connected with the bracket means 17 by a cross pin 19 passing through an opening in the lower end of the member 16, and arranged at its ends to operate in the slots 18. The other end of the band 15 is connected by a pin 20 with a link 21, the said pin also having its ends arranged to operate in the slots 18 of the bracket members. Also connected with the pin 19 and having pivotal connections with the lower or outer end of the link 21 at 22 is a floating lever 23, the body of which operates loosely between the spaced members of the bracket means 17, as does the link 21.

This lever 23 is supported by and connected with an arm 24 on the shaft 25. This shaft 25 is carried by suitable bearing brackets 26 on the frame 1, one end of the shaft 25 being equipped with a clutch shifting yoke 27 and the other end having a downwardly projecting L shaped arm 28 fixed thereto. A coiled spring 29 connects the frame 1 with the arm 28 and is under sufficient tension to cause a quick movement of the shaft 25 beyond the dead center position of the arm 28, looking down on the parts as seen in Figure 1. The spring will thus tend to quickly rock the shaft 25, after proper manual operation, to cause the said shaft to speedily assume either of its operative positions, with the clutch 13 thrown out and the brake band 15 applied, or vice versa, dependent upon the control by the operator.

The parts thus far described in relation to the brake and clutch instrumentalities may be characterized as a clutch and brake unit, one of which is employed in conjunction with each of the traction devices or the multiplane operating gears 9. The said gears 9 are preferably sprockets adapted to be connected by sprocket chains with the driving sprocket means carried by the traction device or multiplane. Or if desired, the gears 9 may be spur gears adapted to be geared on to the driven gear parts of the said multiplane, this being an immaterial variation. It being borne in mind, therefore, that the parts thus far described as to the clutch, brake and sprocket gear means, are duplicated at opposite sides of the frame 1, for the cooperation of both the multiplane or traction devices. The manual control means for each of these units will now be set forth.

There are provided independently operable manual devices 30 and 31, one for the clutch and brake unit at one side of the machine and the other for that at the opposite side. The parts 30 and 31 consist of a rod and hollow actuating sleeve, respectively, the former disposed within the latter, and the two being adapted to be moved slidably or downwardly, simultaneously, or independently, and, of course, similarly moved upwardly. At its lower end the rod 30 is connected by a lever 32, pivoted at 33, with a bell crank lever 34 connected by an adjustable rod connection 35 with the arm 28 on the end of one of the shafts 25. The lower end of the sleeve 31 is connected by a lever 32', coaxially pivoted with the lever 32, to a bell crank lever 34', secured by a rod connection 35' to the arm 28 on the other one of the shafts 25.

The operating rod and sleeves 30 and 31, respectively, being coaxial and nested when the invention is applied to a rotary crane these parts may extend through the center pin of the turntable body of the crane and may be readily operated from a point upon the said turntable or swinging body, somewhat after the manner of the Thew patent previously referred to.

In order to conveniently attach the lower ends of the rods to the levers 32 and 32', suitable provisions may be made by way of loosely surrounding collars 36 having pivotal connections with the said levers.

With the parts constructed as previously described, and the traction shaft 2 driven constantly at high or low speed by the gearing set forth, it will be obvious that the multiplane driving sprocket 9 provided at each end of the shaft 2 may operate loosely on the shaft, thereby permitting of a discontinuance of the drive to the multiplanes. When it is desired to move the machine forward the operator may move the manual devices 30 and 31 simultaneously in one direction, upward in the present instance, and the rock shafts 25 will thus be rocked to correspondingly actuate the clutch yokes 27 to engage the clutches 13 with the brake drums 10, in a positive interlocking manner. Under these conditions both brake drums will be connected with the shaft 2 to rotate therewith, because the clutches 13 are splined upon the said shaft 2. The two multiplanes or traction devices will thus be driven at the same speed and in the same direction by the sprocket gears 9. Variation in this speed may be produced by the actuation of the clutch yoke 8. If the direction of the drive of the main driving gear 7 is reversed the multiplanes or traction devices may be operated at the same speed in the opposite direction, with a high speed or a low speed.

Supposing it be desired to turn the machine as it is moving forwardly, say in a right hand direction as we view the parts in Figure 1. Under these conditions one of the manual devices 30 will be moved downwardly so as to exert a pull inward on the right hand arm 28 of the shaft 25, thereby shifting the right hand clutch yoke 27 to withdraw its clutch 13 from the right hand brake drum 10. Under these conditions the right hand multiplane will not be driven positively but may idle whilst the left hand multiplane is continued to be driven. Furthermore, if the right hand rock shaft 25 is rocked a little farther than to merely disengage the right hand clutch 13, the downward movement on the arm 24 of the said shaft will rock the floating lever 23 and apply the right hand brake band 15 to the right hand brake drum 10, so that the right hand multiplane may be braked to a greater or less degree depending upon the sharpness of the turn of the machine is to be made. A turning of the machine to the right is thus produced by the discontinuance of the drive of the right hand multiplane or an actual braking or locking of said multiplane against movement, as desired by the operator.

By reversing the actuation of the parts 30 and 31, the drive may be continued on the right hand multiplane and that on the left hand one discontinued, or the latter braked and an opposite result will be produced to that just above described, producing a left turn action.

By pulling upwardly on both of the manual devices 30 and 31, the arms 24 may both be rocked downwardly and both brakes 15 will be applied whereby to lock the multiplanes absolutely stationary or brake them more or less, as desired. In order to hold the crane stationary, especially a shovel crane operating against its work, it is desirable that the locking of both multiplanes be achieved and the means above set forth is a convenient way of obtaining the said result.

The manner in which the brakes 15 cooperate with their drums 10 has been indicated as peculiarly novel in that by the method of operating the said brake bands or brakes, they may be availed of to apply to cause a braking action upon the drums 10 when the latter are being driven in either of the opposite directions. The said brake drums 10 operate in opposite directions under control at will by driving the traction shaft 2 in opposite directions for a forward or reverse propulsion of the machine; hence the desirability of oppositely acting braking means cooperating with the drums 10. The action of the brake mechanism is, of course, controlled in conjunction with the parts of the clutch mechanism. It is to be understood that the operating means for the brake and clutch mechanism is such that each brake may be initially thrown out or released, and at a certain point in the movement of the releasing manual instrumentalities the clutch means will be thrown in. The positions adapted to be assumed by each clutch and brake are: brake out or released; clutch in; brake applied; clutch out; or brake being in the course of being applied and clutch being in the course of being released; or brake being in the course of being released and clutch being in the course of being applied.

For a complete understanding of the theory of action of the parts 15, 19, 20, 18, 21 and 23, Figure 6 will be briefly referred to. In this figure the parts are diagrammatically illustrated, the arrow $a$ showing the brake drum turning in a contra-clockwise direction, and arrow $b$ showing the brake drum turning in a clockwise direction. 21' is the equivalent of the link 21; 23' the equivalent of the floating lever 23; 20' the equivalent of the pin or pivot 20; and 19' the equivalent of the pin or pivot 19.

Assuming that the brake drum 10 is turning in a counter-clockwise direction of arrow $a$, a pull on the member $c$ in a rightward direction will cause the brake end at 19' to move along the slots of the bracket means 17' away from the adjacent ends of the said slots, thereby tightening the brake band in an efficient manner because the end of the band at 20' is fixed and the pivot 20' has a bearing against the adjacent ends of the slots. The rotation of the drums 10 tends to render effective the last mentioned bearing action.

If the rotation of the drums 10 be clockwise the brake end at the pivot or pin 20' tends to move along the slots of the bracket means 17' and tighten the brake band; the end of the brake band at the pivot or pin 19' having a bearing against the adjacent opposite ends of the slots.

In effect, the link and lever parts are a toggle unit which renders it necessary only to apply a minimum amount of force to set the brake 15 against its drum effectively.

In Figures 4 and 5, there is illustrated a modified adaptation of the invention in which, however, the same principles of action in respect to the operation of the clutch and brake elements for the clutch and brake drums 10, are availed of. In the construction of the modification, referring now to Figures 4, 5, and 7, the manual operating rod is 30' directly connected with a rocker arm 30'' mounted on one of the shafts 25'. The said shaft 25' has an arm 37 connected with an arm 38 on the clutch and brake actuating shaft 39, the latter having the brake actuating arm 40 operating substantially the same as the arm 24, previously described.

At the point of connection between the arms 37 and 38, is connected the spring 41 acting as does the spring 29 in the first described construction. The sleeve member 31' of the modification being described is connected with the arm 31'' of the other rock shaft 25'', and the latter is connected with the brake and clutch parts in just the same manner as above immediately set forth, by means of the members 37, 38, 39, 40, and 41. The shafts 39 carry the clutch yokes designated 42, functioning like the yokes 27, previously set forth.

It will be apparent upon referring to Figure 1 that the change speed mechanism comprising the various gears 3, 4, 6, 7 and cooperating parts, is carried by the traction base of the machine. The clutch member 3' in this construction is designed to be operated by a lever 8' which is attached to the yoke 8 previously referred to. The said lever will be operable by a person or operator standing on the ground and having access to the lever 8' from one end of the machine.

Figure 9:
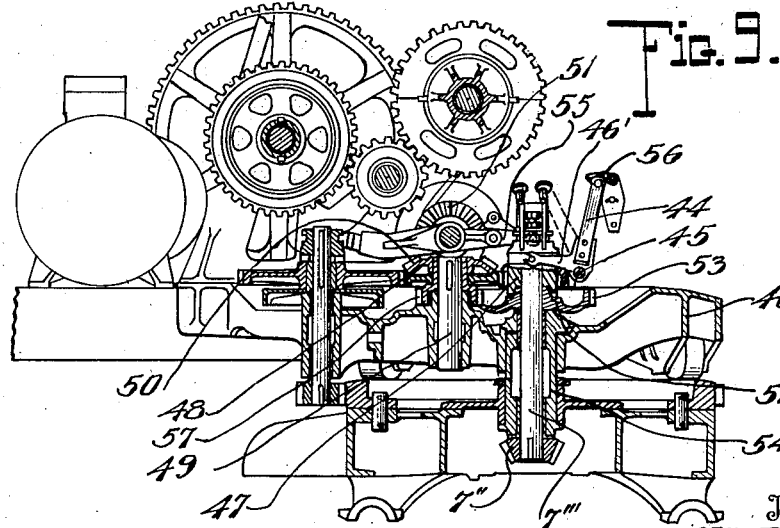
Figure 9 is a sectional view of the mechanism of Figure 8.

For the construction of the invention illustrated in Figures 4 to 9 inclusive, a separate change speed mechanism is employed which is best seen on referring to Figure 9. The said mechanism will now be described and consists of a lever 44 pivoted at 45 to the turntable or rotary body 46 of the machine. The lever 44 is equipped with a yoke 46' adapted to move up and down the combined clutch and gear member 47. The gear of the member 47 engages a spur gear 48 mounted upon a vertical driving shaft 49 also carried in suitable bearings in the turntable 46. Above the gear 49 is a bevelled gear 50 engaging a corresponding gear 51 which transmits power or motion to the gears 48 and 50. The clutch element of the combined gear and clutch member 47 is adapted to engage with clutch teeth 52 provided on the upper side of a low speed gear 53 which is carried by the traction drive shaft 7''' which supports the bevel pinion 7'' both previously described in conjunction with Figure 5 of the drawings. The shaft 7''' is mounted in the tubular center pin axle of the turntable which pin is best shown at 54 in Figure 9. Upon its upper end the shaft 7''' carries a clutch 55 having clutch teeth at its lower end to engage with corresponding teeth 52 on the upper end portion of the combined gear and clutch 47. A latch 56 may be used to lock the lever 44 in the position of its full lines in Figure 9 after having been moved from its dotted line position of said figure.

With the construction of the parts as above set forth the operation of the change speed devices of the form of the invention just referred to is as follows. When the lever 44 is in the position shown in full lines in Figure 9, the gear of the combined clutch and gear member 47 is in mesh with the gear 48. Under these conditions the drive is from the gear 48 to the gear of the member 47, to the clutch member 55 and thence to the shaft 7''' and its gear 7''. The clutch 55 is keyed onto the shaft 7''' and said clutch is always engaged with the combined clutch and gear member 47 when the traction means of the machine is being driven either at high speed or low speed. According to the cooperation 48, 47 and 55 aforesaid, high speed of the traction means will be obtained, the gear 48 being larger than the gear of the member 47. Supposing then that the lever 44 is unlatched and caused to assume the position of dotted lines in Figure 9. Under these conditions the member 47 will be lowered and its bottom teeth caused to engage the clutch teeth 52 of the gear 53. Then the member 47 is driven by the gear 53 and at the same rate of speed as said gear. The gear 53 however is operated at low speed through its engagement with a gear 57 keyed to the shaft 49 said gear 57 being a low speed gear. Of course when the member 49 is clutched to the gear 53 it is no longer in mesh with the gear 48.

The lever 44 is so located as to be conveniently operated by the foot of the crane operator, and the latch 56 may also be kicked off from the lever 44 to disengage the two.

Figure 8, shows also the two operating levers 58 used to actuate the sleeve 31' and the rod 30' seen best in Figures 4 and 5 and 7; the two levers 58 are separately manipulatable in order to actuate the parts 30' and 31' independently for the purposes previously set forth from the description of the operation of the steering and braking control devices.

Having thus described my invention, what I claim as new and desire to secure by Letters Patent, is:

1. In controlling and driving mechanism of cranes for excavating purposes, in combination, a traction frame, excavating means carried thereby traction device operating gears carried by said frame, a traction shaft on which said gears are mounted, means for operating the traction shaft constantly to turn the same in either direction, means for clutching said operating gears to the driving shaft, brake means for said operating gears, means for applying said brake means to render the same equally effective in relation to the operating gears when the latter are turning in either of their opposite directions of movement, and connections whereby when the operating gears are unclutched relatively to the traction shaft the brake means may be simultaneously rendered effective, whereby the crane may be held positively against movement while its excavating means are digging.

2. In controlling and driving mechanism of cranes for excavating purposes, in combination, a traction frame, a traction shaft mounted on the said traction frame and extending as a unit from side to side of said frame, means for driving said traction shaft in opposite directions and at high or low speeds, driving gears loose on the traction shaft and adapted to operate separate traction devices on which the traction frame is mounted, brake and clutch drums connected to said driving gears and loose on the traction shaft; brake and clutch units cooperating with each of the clutch drums and separate manual devices cooperative with the said brake and clutch units for actuation of the clutch parts of the clutch to render the same effective on the drums and to at the same time actuate the brake parts of said units to render the same ineffective in respect to the drums, said separate manual devices being settable to operate the brakes to hold the crane in digging position.

3. In crane driving and steering mechanism, in combination, a traction frame, a drive shaft thereon, traction driving means on said shaft at each side of the frame, a set of clutch and brake elements for controlling each of said driving means, a pair of parallel operating shafts for said clutch and brake elements, independent co-axial actuating means for said operating shafts, a driving member for said drive shaft co-axial with the independent actuating means, change speed control means associated with the drive shaft, and a single control for said last mentioned means.

4. In crane driving and steering mechanism, in combination, a traction frame, a drive shaft thereon, traction driving means on said shaft at each side of the frame, a set of clutch and brake elements for controlling each of said driving means, a pair of parallel operating shafts for said clutch and brake elements, independent co-axial actuating means for said operating shafts, a driving member for said drive shaft co-axial with the independent actuating means, and change-speed control means associated with the drive shaft.

5. In steering and driving mechanism for excavating cranes wherein traction devices are operated to effect traction and steering operations of the crane and which traction devices must be locked against movement to hold the crane against digging operation of the excavating mechanism, the combination with a traction shaft, operating gears carried by said crane traction shaft on which said gears are mounted, and means for driving the traction shaft, of means for clutching the operating gears to the driving shaft, brake means for said operating gears, and means for applying the brake means to render the same effective in relation to the operating gears and clutch means to effect steering action on the part of the traction devices, including brake applying means also operable to render the brake means simultaneously effective whereby the crane may be held positively against movements while its excavating means are digging.

6. In excavating apparatus of the shovel type, steering and driving mechanisms, comprising, in combination, a traction crane, a traction drive shaft mounted on the crane, gears on said shaft for driving the traction device at each side of the machine, means for driving the shaft, means for selectively clutching the operating gears to the driving shaft, brake means for said gears, and separate manual devices cooperative with the brake and clutch means to render the same properly effective to cause steering action on the part of the traction device, said manual devices being also operable to apply the brakes to hold the excavator against digging action on the part of the shovel device.

HAROLD E. BREY.